(12) United States Patent
Chen

(10) Patent No.: US 8,359,341 B2
(45) Date of Patent: Jan. 22, 2013

(54) IMPORTING CONTENT INTO A CONTENT MANAGEMENT SYSTEM USING AN E-MAIL APPLICATION

(75) Inventor: Jesse Feng Chen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1296 days.

(21) Appl. No.: 11/299,527

(22) Filed: Dec. 10, 2005

(65) Prior Publication Data

US 2007/0136354 A1    Jun. 14, 2007

(51) Int. Cl.
*G06F 17/40* (2006.01)
(52) U.S. Cl. ........................................ 707/822
(58) Field of Classification Search ................. None
See application file for complete search history.

(56) References Cited

U.S. PATENT DOCUMENTS

| | | | | |
|---|---|---|---|---|
| 5,710,883 A * | 1/1998 | Hong et al. | ...................... | 709/246 |
| 5,826,269 A | 10/1998 | Hussey | | |
| 5,923,848 A * | 7/1999 | Goodhand et al. | ............ | 709/219 |
| 5,937,160 A * | 8/1999 | Davis et al. | .................... | 709/203 |
| 6,073,166 A * | 6/2000 | Forsen | ........................... | 709/206 |
| 6,146,026 A * | 11/2000 | Ushiku | ......................... | 709/207 |
| 6,272,532 B1 * | 8/2001 | Feinleib | ........................ | 709/206 |
| 6,684,239 B1 * | 1/2004 | Flepp et al. | .................... | 709/206 |
| 6,993,559 B2 * | 1/2006 | Jilk et al. | ....................... | 709/206 |
| 7,127,491 B2 * | 10/2006 | Zirnstein, Jr. | ................. | 709/206 |
| 7,543,031 B2 * | 6/2009 | Heidloff et al. | ............... | 709/206 |
| 2002/0006790 A1 * | 1/2002 | Blumenstock et al. | ........ | 455/423 |
| 2002/0023093 A1 | 2/2002 | Ziff et al. | | |
| 2002/0143812 A1 * | 10/2002 | Bedingfield | ................... | 707/511 |
| 2002/0169865 A1 | 11/2002 | Tarnoff | | |
| 2002/0184255 A1 | 12/2002 | Edd et al. | | |
| 2003/0163519 A1 * | 8/2003 | Kegel et al. | ..................... | 709/203 |
| 2004/0107365 A1 * | 6/2004 | Hogg | ............................. | 713/201 |
| 2004/0143636 A1 * | 7/2004 | Horvitz et al. | ................ | 709/207 |
| 2005/0125535 A1 | 6/2005 | Gatt | | |
| 2006/0259468 A1 * | 11/2006 | Brooks et al. | ..................... | 707/3 |

FOREIGN PATENT DOCUMENTS

| | | |
|---|---|---|
| EP | 0987641 A2 | 3/2000 |
| GB | 2339039 A * | 1/2000 |
| GB | 2339039 A3 | 1/2000 |
| GB | 2343091 A * | 4/2000 |
| JP | 2002342347 A | 11/2002 |
| JP | 2003058542 A | 2/2003 |
| JP | 2003178009 A | 6/2003 |
| JP | 2004145511 A | 5/2004 |
| WO | 9904347 A | 1/1999 |
| WO | 9962003 A1 | 12/1999 |
| WO | 0231682 A3 | 4/2002 |

OTHER PUBLICATIONS

Microsoft Office Outlook 2003.*

* cited by examiner

*Primary Examiner* — Hung Q Pham
*Assistant Examiner* — Hubert Cheung
(74) *Attorney, Agent, or Firm* — Patterson & Sheridan, LLP

(57) ABSTRACT

An e-mail based content import system imports content into a content management system using an e-mail application. A user selects values for address fields of an e-mail, enters a content item in a body of the e-mail, enters content metadata in a body text of the e-mail, and selects files as an attachment to the e-mail. The user sends the e-mail to the content management system. An e-mail processing engine processes the e-mail body to extract the content item and content metadata and maps the values of the address fields to content metadata to generate content comprising the content item, content metadata, and associated files. The mapping of the system comprises a predetermined customizable mapping of the address fields to the content metadata.

12 Claims, 7 Drawing Sheets

IMPORTING CONTENT INTO A CONTENT MANAGEMENT SYSTEM USING AN E-MAIL APPLICATION

FIELD OF THE INVENTION

The present invention generally relates to a content management system, and more particularly to importing content into the content management system using a web-based e-mail application.

BACKGROUND OF THE INVENTION

With a focus on providing new growth opportunities for the media and publishing enterprise, IT organizations are responding to an increased demand for new and improved web content management (WCM) features. Concurrently, organizations are also faced with an imperative to reduce the cost of deploying, customization, and servicing WCM solutions.

A conventional web content management solution comprises a browser-based content entry application and a browser-based content web site. The browser based content entry application allows content producers (within or outside a company) to define, create, and maintain content. This community of users performs functions comprising collaborating with peers, sending content through an approval workflow, assigning metadata tags to the content, and deploying the content to other parts of the organization through XML or other sharing methods.

The browser-based content web site allows consumers who interact with the content delivered over the Internet to, for example, find, view, e-mail, rank, print, and comment on particular articles of interests. Consumers in this context comprise external users, customers, partners, suppliers, and employees. This community requires access to information of interest or information needed to perform any required task regardless of the source of that information. This audience is a target for the content management system.

The browser-based content web site delivers content (e.g., news articles, product support information, etc.) by retrieving items from a database, formatting the retrieved items with HTML tags, and presenting the formatted items to a browser of the user.

Although conventional web content management solutions have proven to be useful, it would be desirable to present additional improvements. Challenges associated with the browser-based content entry application comprise development cost of the browser-based entry application, a learning curve of a user of the browser-based content entry application, and applicability of the browser-based content entry application.

Most content entry applications require customization because each customer desires a customized look-and-feel that matches, for example, the business objectives of the customer. For example, an on-line newspaper wants reporters to deliver timely news articles to subscription-paying readers while a computer support site wants to deliver the most relevant trouble-shooting articles on a product. These very different requirements lengthen the time needed to design, implement, and deploy the browser-based content entry application, thus driving up the cost of development.

Most content entry applications such as the web-based content entry application require training of the end users. Content entry applications incorporate functionality comprising, for example, content entry templates, version control, metadata tagging, workflow, and search. Designing intuitive information architecture around these functions is a challenge. Many content entry applications are too complicated for end users to use without training, making it difficult to roll out across the entire enterprise.

Web-based content entry applications are not always practical. For reporters writing news-stories in Iraq during fighting, logging onto the Internet and pulling up the Web pages to enter content is not feasible.

An alternative content entry interface is required to speed up the delivery of timely content in a cost-effective manner for users and developers that does not require extensive training for users. What is therefore needed is a system, a computer program product, and an associated method for importing content into a content management system using an e-mail application. The need for such a solution has heretofore remained unsatisfied.

SUMMARY OF THE INVENTION

The present invention satisfies this need, and presents a system, a computer program product, and an associated method (collectively referred to herein as "the system" or "the present system") for importing content into a content management system using an e-mail application. Using an e-mail interface of an e-mail client application of the present system, a user selects values for one or more address fields of an e-mail, enters a content item in a body of the e-mail, and enters content metadata in the body of the e-mail. The user further selects zero or more files associated with the content item by specifying the files as an attachment to the e-mail. The user sends the e-mail to the content management system.

An e-mail processing engine of the present system processes the e-mail body to extract the content item and any content metadata. The e-mail processing engine maps the values of the address fields to content metadata to generate content comprising the content item, content metadata, and associated files. The mapping of the present system comprises a predetermined customizable mapping of the address fields to the content metadata.

The present system may be embodied in a utility program such as an e-mail based content import utility program. The present system also provides a method for the user to generate content comprising a content item, content metadata, and optional associated files for import by a content management system by invoking an e-mail client application of the e-mail based content import utility to enter a content item as text, metadata as e-mail addresses or text entered in predetermined location in the text, and associated files as attached files. The user initiates import of the content by the content management system by initiating transmission of the e-mail.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standard protocols to form a global, distributed network.

World Wide Web (WWW, also Web): An Internet client-server hypertext distributed information retrieval system.

Figure 1:
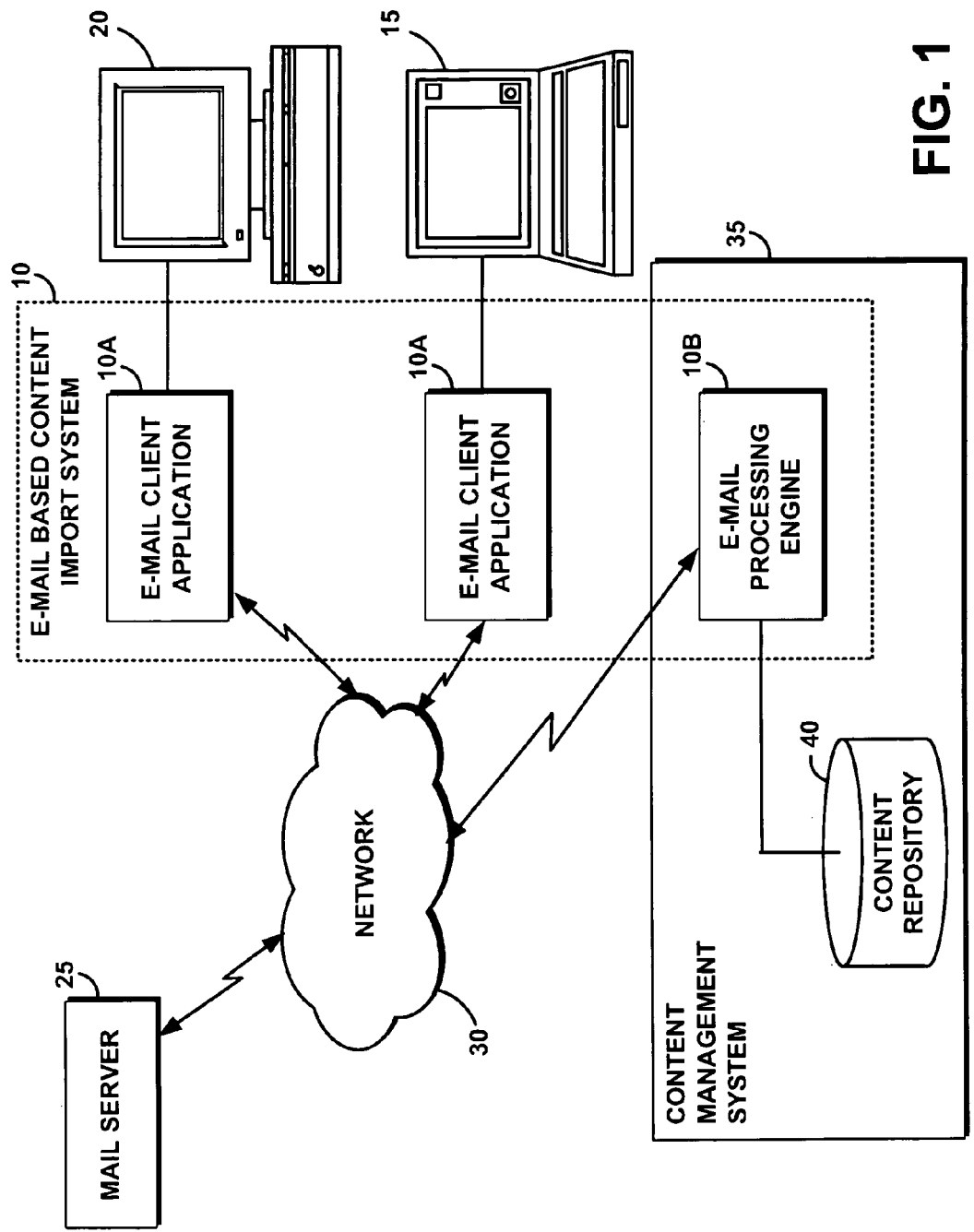
FIG. 1 is a schematic illustration of an exemplary operating environment in which an e-mail based content import system of the present invention can be used.

FIG. 1 portrays an exemplary overall environment in which a system, a service, a computer program product, and an associated method (the e-mail based content import system 10 or "system 10") for importing content into a content management system using an e-mail application according to the present invention may be used. System 10 comprises a software programming code or a computer program product that is typically embedded within, or installed on a computer. Alternatively, system 10 can be saved on a suitable storage medium such as a diskette, a CD, a hard drive, or like devices.

System 10 comprises an e-mail client application 10A and an e-mail processing engine 10B. Users, such as remote Internet users, are represented by a variety of computers such as computers 15, 20, and can access an e-mail server 25 through a network 35 using the e-mail client application 10A.

Using an e-mail user interface provided by the e-mail client application 10A, users compose content and provide content metadata in an e-mail format, generating an e-mail. The e-mail client application 10A sends the generated e-mail to the mail server 25 via a network 30. The mail server 25 sends the e-mail to the content management system 35 via network 30. The content management system 35 manages content, importing content in a variety of forms and formats from various sources and distributing content to a variety of targets. For example, a content management system 35 may be used by a news service. Content sources are reporters; targets are various news syndicates, newspapers, magazines, wire services, etc. The content managed by the content management system 35 comprises a content item and content metadata. The content item comprises text, images, etc. The content metadata comprises information associated with the content item.

The content management system 35 comprises the e-mail processing engine 10B and a content repository 40. The e-mail processing engine 10B processes the e-mail, mapping body text and other values in the e-mail format to the content item and the content metadata.

The mail server 25 receives incoming e-mail and delivers the e-mail to a local recipient or it sends outgoing mail to the Internet. The mail server 25 may bounce the e-mail back to the sender if a recipient address of the e-mail is not found. The mail server 25 may queue incoming mail according to urgency or first come, first delivery.

The mail server 25 provides functionalities useful for system 10. These functionalities comprise submission of content from any source to a target destination; supports rules of delivery such as, for example, scheduling and urgency, and filters of content; and provides a user interface.

When an e-mail is imported as content into the content management system 35, the body of the e-mail is treated as the content item such as a news article and the sender of the e-mail is the author. The mail server 25 queues the e-mail in an outgoing mailbox. The content then goes through a predetermined workflow, gets approved, and is automatically categorized. For example, a news article is sent to a destination iraq-news@onlinenews.com is automatically characterized by system 10 as "News articles from Iraq" and posted live by the content management system 35 on the web site of the news company, OnlineNews.

System 10 uses e-mail as a content-entry application of the content management system 35. E-mail is an application used by most users of the Internet and is simpler to use than most Web sites. E-mail is already deployed in most content management systems, making implementation of system 10 inexpensive and easy. E-mail provides timely and efficient import of content into the content management system 35. Access to e-mail is available on personal digital assistants (PDAs) and cell phones, making e-mail a common interface for business users such as reporters, sales personnel, field support engineers, writers, bloggers, etc. Using e-mail as a content-entry application of the content management system 35 can save design, implementation and deployment cost for an enterprise needing such a system.

System 10 uses e-mail "subject", "to", "cc", and "bcc" fields as input fields of predefined metadata. Mapping between the input fields of the e-mail and content metadata is customizable by the client of the content management system. System 10 uses the body field of e-mail as input for a content item, e.g., a news article. System 10 uses e-mail attachments as input for files with various mime types, e.g., a photo, or a PDF white paper.

Figure 2:
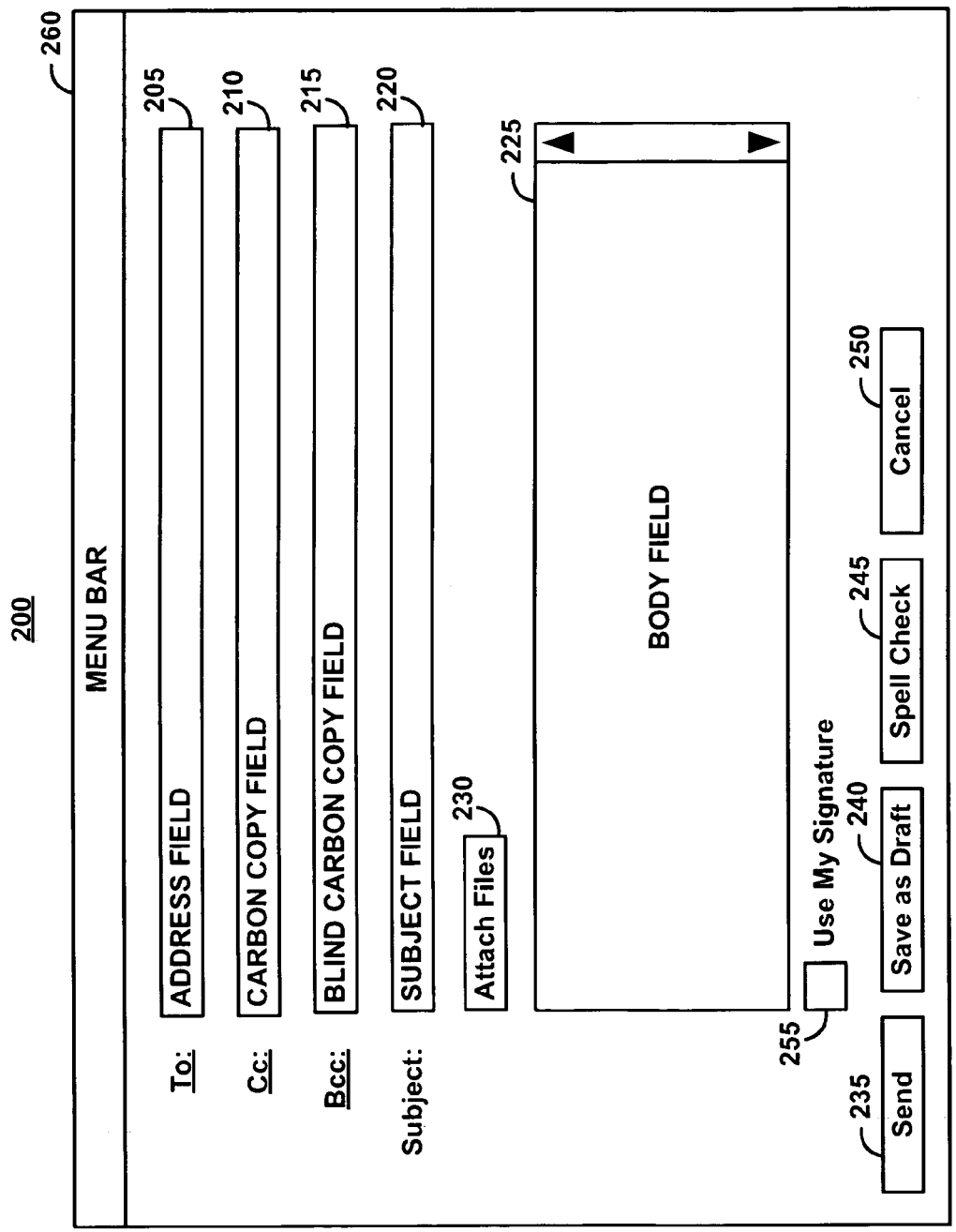
FIG. 2 is an exemplary screen shot illustrating a user interface for the e-mail client application of the e-mail based content import system of FIG. 1.

FIG. 2 illustrates an exemplary screen shot of a user interface 200 (further referenced herein as an e-mail interface 200) for use by the e-mail client application 10A. The user interface 200 resembles a standard web-based e-mail interface. Consequently, the learning curve for an average e-mail user is minimal because the functionality of the e-mail interface 200 is familiar to the user.

The e-mail interface 200 comprises an address field 205, a carbon copy field 210, a blind carbon copy field 215, a subject field 220, and a body field 225. Text in the body field 225 is interchangeably referenced as body text or body. The e-mail interface 200 further comprises an attach files button 230 for attaching files to the e-mail. The e-mail interface 200 comprises a send button 235 to initiate sending an e-mail, a "save as draft" button 240 to save the e-mail in draft form, a "spell check" button 245 to spell check text in the body field 235, a cancel button 250 to cancel entry for a current e-mail. A "use my signature" checkbox 255 allows a user to instruct the e-mail client application 10A to add a preconfigured signature to an e-mail when the e-mail is sent. The functionalities and features presented in the e-mail interface 200 are exemplary only, additional functionalities or features may be provided.

To further illustrate system 10, an exemplary application of system 10 for a newspaper is presented. The newspaper has an on-line publication and a print publication. Reporters for the newspaper provide articles to the newspaper via computers 15, 20. The newspaper utilizes the content management system 35 with system 10 to import content provided by the reporters into the content management system 35. In this example, content comprises an article as the content item, content metadata, one or more images, etc. The content metadata comprises information about the article. Typical content metadata comprises values such as, for example, a title, an author name, a heading, a body, a publish date, an expiration date, whether an image is attached to the article, image management details, advertising associated with the article, etc.

For example, a content contributor, in this case, a staff writer of the Wall Street Journal, John Doe, is writing an article by filling out the following fields:
Title: "Dow Closes Down 103 on Hedge Fund Rumors"
Author Name: "John Doe, WSJ Staff Writer"
Heading: "Dow Closes Down 103, Nasdaq Drops 17 . . . "
Body: "NEW YORK (AP)—Stocks tumbled . . . "
Publish Date: "May 10, 2005"
Expiration Date: "May 13, 2005"
All other fields blank or default values
When John clicks the send button 235, this article is e-mailed to content management system 35, saved in the content repository 40, routed through a workflow, then published on a live Web site for WSJ.com readers to view. Exemplary other fields comprise a topic field, a type field, a field indicating an image is to be used, one or more fields indicating use of the image, one or more fields indicating association of advertising, etc.

Figure 3:
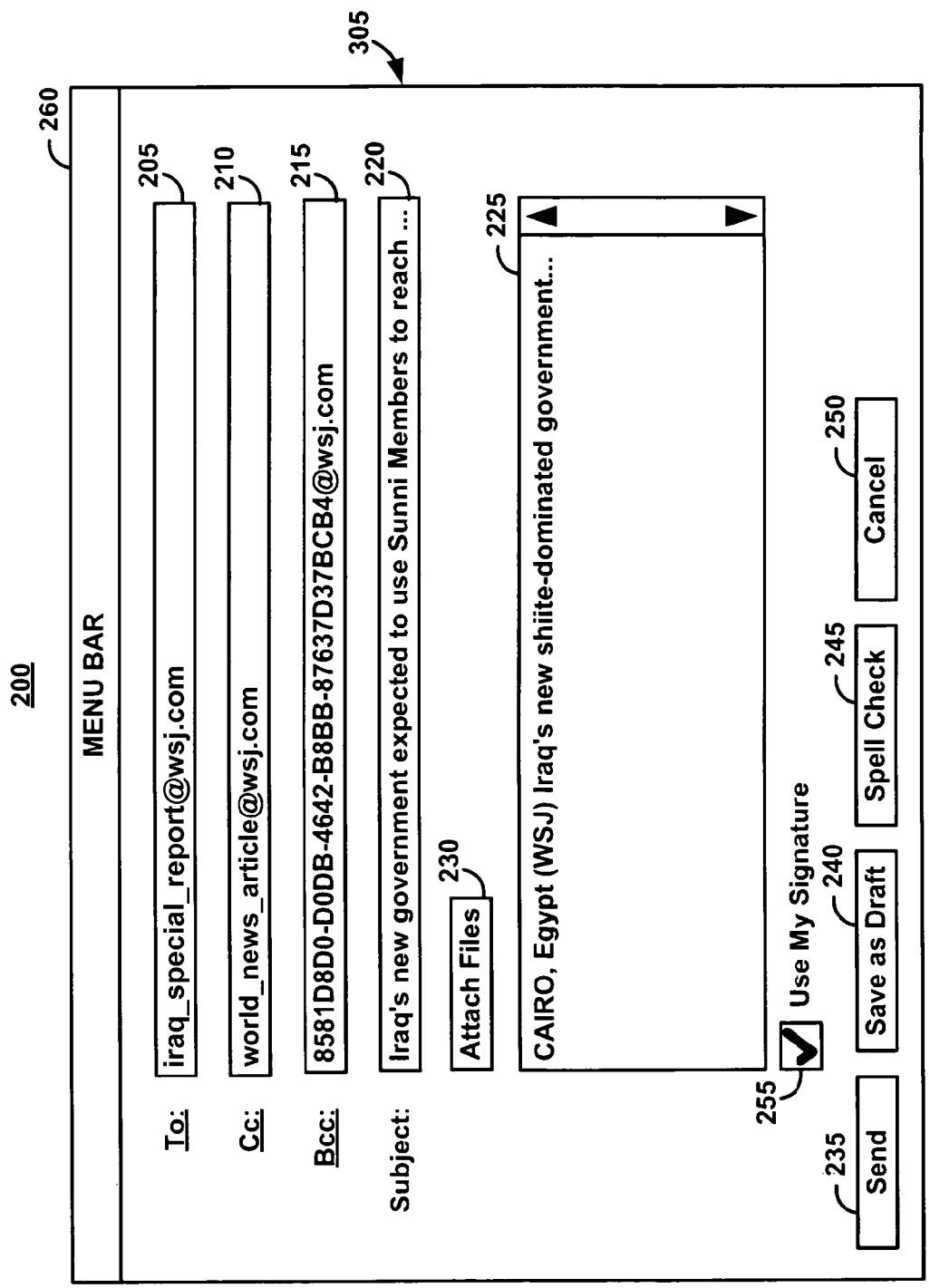
FIG. 3 is an exemplary screen shot illustrating a user interface for the e-mail client application of the e-mail based content import system of FIG. 1 as used for content entry in a exemplary news environment.

Using system 10, a content contributor (e.g., a reporter in Iraq working for the Wall Street Journal) composes an e-mail as illustrated in the e-mail 305 of FIG. 3. The reporter fills out the subject field 220, the address field 205, the carbon copy field 210, and the body field 225. The e-mail client application 10A automatically fills in a "from" field, as instructed by the reporter via selecting the "use my signature" checkbox 255.

The address field 205 uses the e-mail address of the recipient iraq_special_report@wsj.com, indicating a destination inbox for the news article is "Iraq Special Report". The e-mail address of the recipient further indicates that the article is of a content type associated with a set of specific metadata that resides on the server but is hidden from the author. For example, this type of article may go through a shorter workflow to get published.

The carbon copy field 210, world_news_article@wsj.com, categorizes this article into another content type called "World News Articles". The carbon copy field 210 can comprise one or more addresses, each separated by a comma, for example. Any appropriate character may be used as a separator. This is a typical default feature of the e-mail client application 10A.

The blind carbon copy field, 8581 D8D0-D0DB-4642-B8BB-87637D37BCB4@wsj.com, comprises any additional parameters, with each parameter separated by a dash "-". In one embodiment, additional parameters are represented by additional e-mail addresses, separated by commas, for example. Any appropriate character may be used as a separator. These additional parameters may indicate mappings to metadata, statistical counters, advertisement categories, etc. For example, a value 8581 D8D0 can indicate "show ads for global companies" because the article in the e-mail 305 is a news article reported from other parts of the world.

Additional content metadata may be included in the body field 225 with the content item. For example, an expiration date may be placed at the end of text in body field 235, following the content item such as an article. A heading may be placed at the beginning of the text in the body field 235, preceding the article.

Metadata associated with the e-mail may be used as content metadata. For example, a mail server 25 provides a time/day stamp for each e-mail. This time/day stamp may be used as a publish date for an article imported into a content management system 35 using system 10.

System 10 uses e-mail addresses to map content metadata from e-mail addresses. E-mail addresses are suitable for mapping because their nomenclature is unique and flexible. The naming convention of e-mail addresses for system 10 is dependent on content type definitions in the content repository 40. Well-developed content taxonomy (content categorization for a business purpose) can assist in naming the e-mail address. For example, a product technical support web site may comprise an exemplary taxonomy as listed in Table 1.

TABLE 1

An exemplary taxonomy for a product technical support website.

| Product Information | |
| --- | --- |
| Publications | Redbook |
| | Whitepaper |
| Trouble-shooting Articles | |
| Downloads | Fixpacks |
| | eFix |
| | Patches |

Correspondingly, e-mail addresses associated with the taxonomy of Table 1 can be named as follows:
product_info@supportwcm.anycompany.com
pub_redbook@supportwcm.anycompany.com
pub_whitepaper@supportwcm.anycompany.com
troubleshoot@supportwcm.anycompany.com
downloads_fixpacks@supportwcm.anycompany.com
downloads_efix@supportwcm.anycompany.com
downloads_patches@supportwcm.anycompany.com Content metadata can comprise any key information related to a content item. One metadata is the product name itself, i.e., Product. So an e-mail address of Product@supportwcm.anycompany.com can indicate the category of product name.

Figure 4:
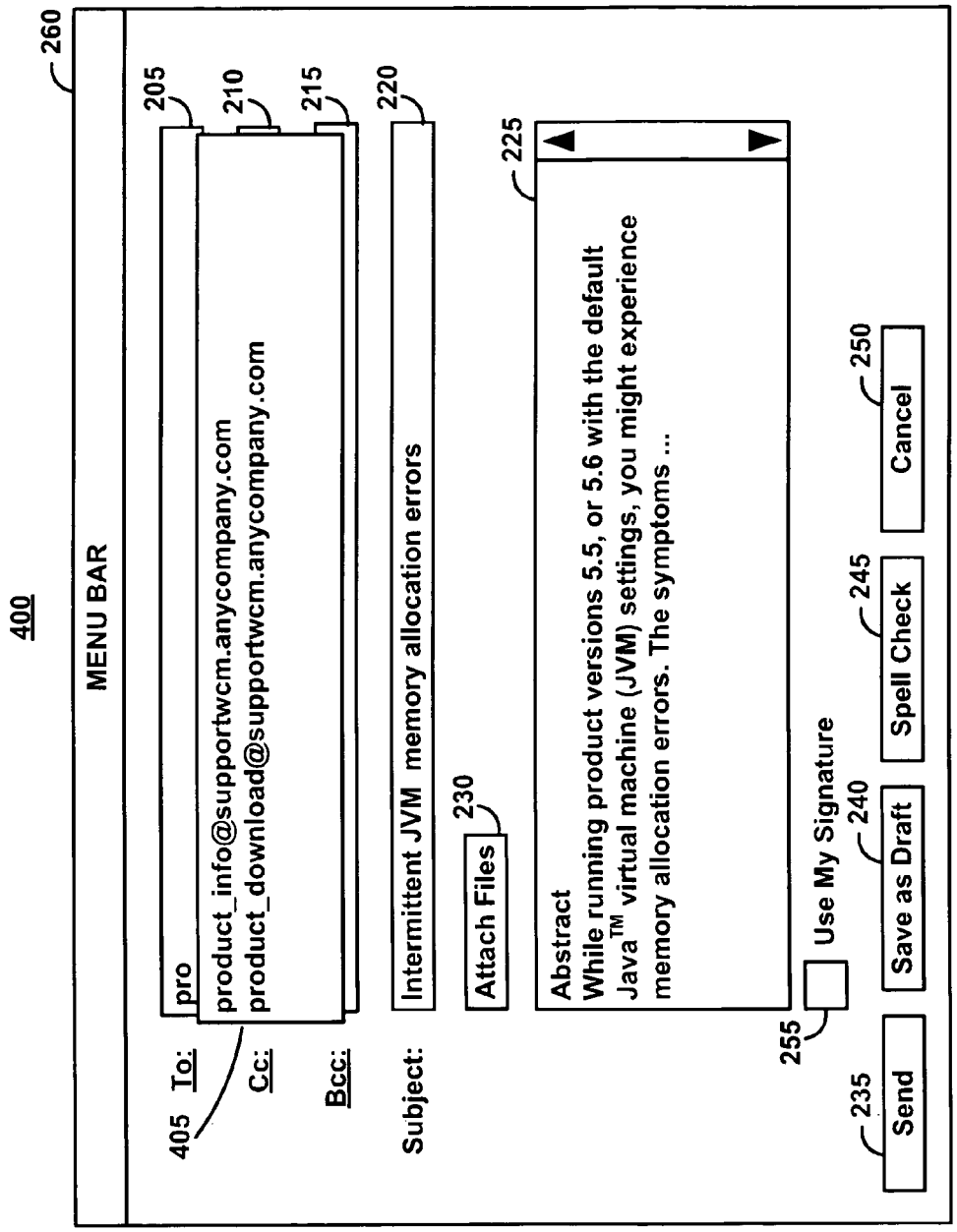
FIG. 4 is an exemplary screen shot illustrating a user interface for the e-mail client application of the e-mail based content import system of FIG. 1 using a drop-down menu.

FIG. 4 illustrates an e-mail that support personnel may submit comprising a troubleshooting article regarding a JVM memory allocation issue. System 10 allows the support personnel to submit the troubleshooting article directly into the content repository 40. Once the support team approves the troubleshooting article, the troubleshooting article is made available to external customers.

Content may have many items of content metadata associated with the content item. Each item of content metadata is represented by an e-mail address entered in the carbon copy field 210 or value separated by dashes in the blind carbon copy field 215. Drop-down menus such as drop-down menu 405 assist a user in selecting appropriate e-mail addresses for desired content metadata. Front-end technology such as JavaScript allows pre-caching a list for e-mail addresses and values inside the e-mail client application 10A, thus providing a list from which a sender can choose an address or other value.

The e-mail client application 10A can further comprise an "address search" function. A pull-down menu 405 illustrates a context-sensitive list that "pops up" as a user enters letters in the address field 205. The user remembers that appropriate address is associated with "product" and begins typing in the address field 205. With a letter "p" entered, the e-mail client application 10A provides a list of all addresses beginning with the letter "p". With letters "pr" entered, the e-mail client application 10A provides a list of all addresses beginning with the letters "pr". With letters "pro" entered, the e-mail client application 10A provides a list of all addresses beginning with the letters "pro" as shown in pull-down menu 405. The user can select the desired address from the drop-down menu 405.

Figure 5A:
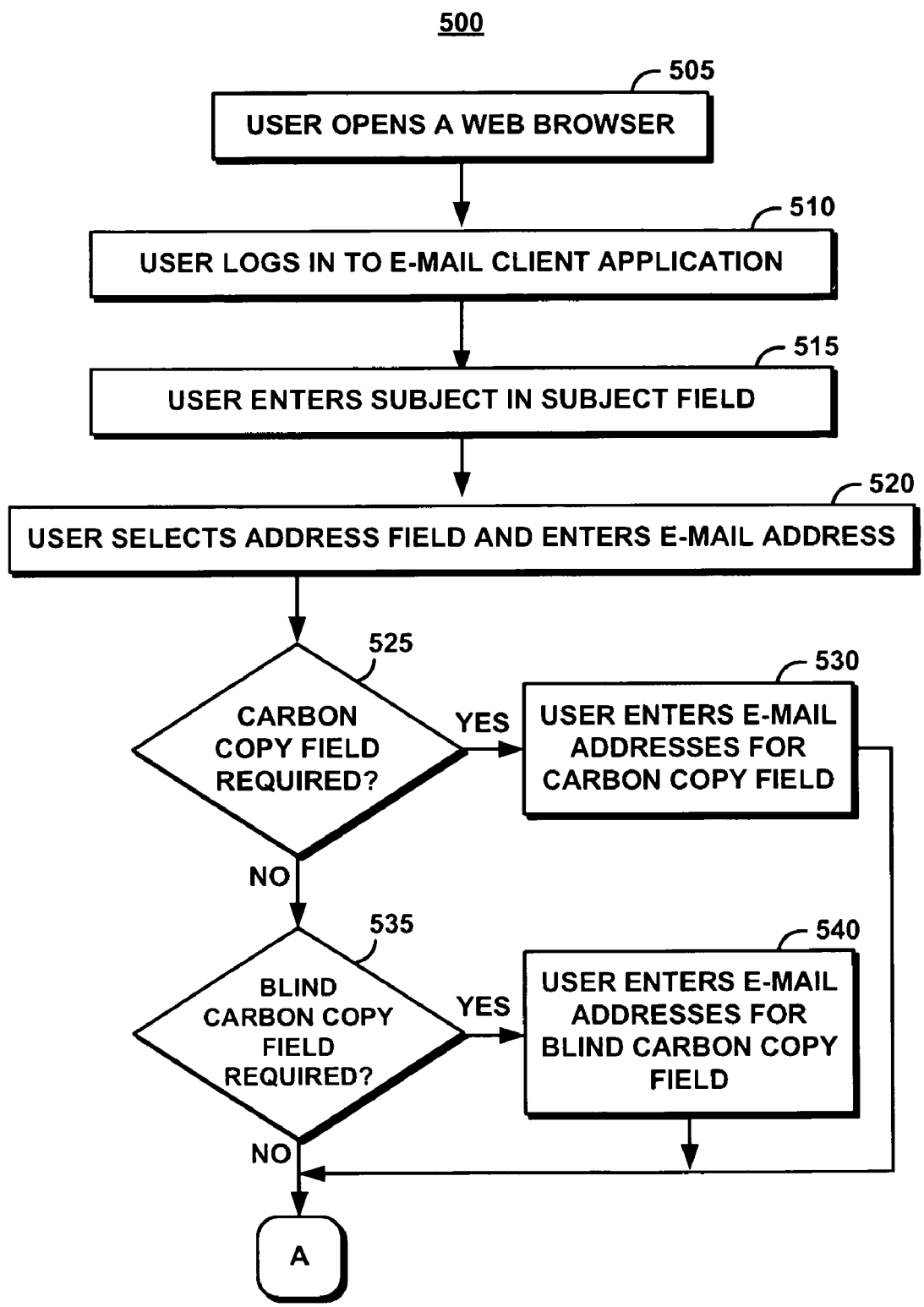
FIG. 5 is comprised of FIGS. 5A and 5B and represents a process flow chart illustrating a method of operation of a user utilizing an e-mail client application of the e-mail based content import system of FIG. 1.
Figure 5B:
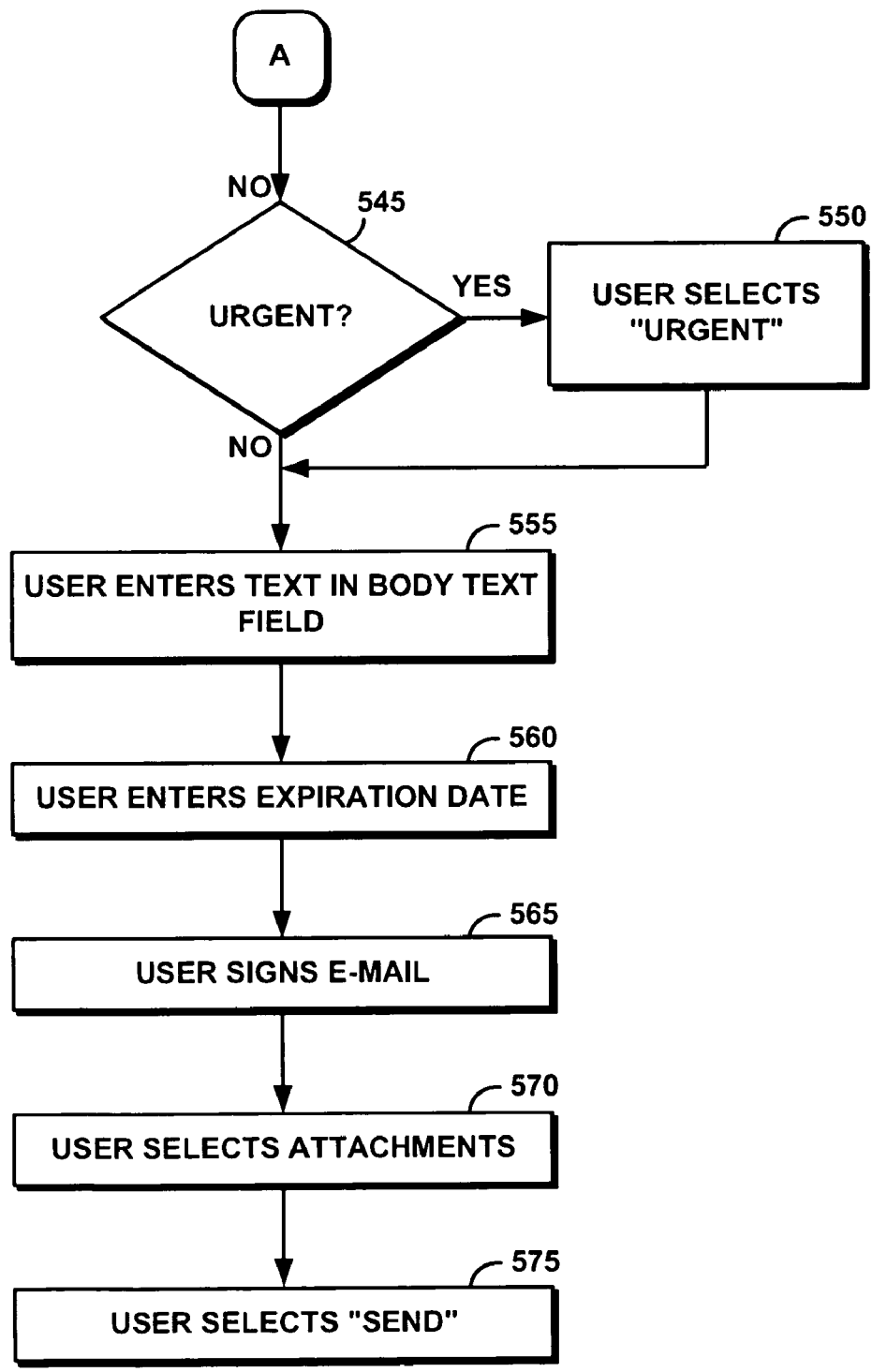

FIG. 5 (FIGS. 5A, 5B) illustrates an exemplary method 500 of a user utilizing the e-mail client application 10A to generate content for the content management system 35; the content generated illustrates an exemplary application of system 10 in generating a news article. The user opens a web browser (step 505). The web browser may be on a computer, a PDA, a cell phone, or like devices comprising a connection to the Internet. The user logs in to the e-mail client application 10A (step 510). The user enters a subject in the subject field 220 (step 515). The user selects the address field 205 and enters an e-mail address (step 520); the e-mail address represents content metadata such as, for example, a topic or a type. A pull-down menu such as pull-down menu 405 is presented by the e-mail client application in response to letters entered by the user. The pull-down menu provides a list of possible e-mail addresses based on letters entered by the user. The user enters an e-mail address in the address field 205 by typing the address in the address field or selecting an address from the pull-down menu.

The user determines whether the carbon copy (CC) field 210 is required (decision step 525). The e-mail client application can pre-fill the CC fields with predetermined addresses, if any is available. Such default addresses could be determined by the administrator ahead of time according to the client's business needs. If it is determined at step 525 that the carbon copy field 210 is required, the user enters one or more e-mail addresses in the carbon copy field 210 (step 530). A pull-down menu such as pull-down menu 405 is presented by the e-mail client application in response to letters entered by the user. The pull-down menu provides a list of possible e-mail addresses based on letters entered by the user. The user enters an e-mail address in the carbon copy field 210 by typing the address in the address field or selecting an address from the pull-down menu.

The user determines whether the blind carbon copy field 210 is required (decision step 535). If the blind carbon copy field (BCC), the user enters one or more e-mail addresses in the blind carbon copy field 215 (step 540). A pull-down menu such as pull-down menu 405 is presented by the e-mail client application in response to letters entered by the user. The pull-down menu provides a list of possible e-mail addresses based on letters entered by the user. The user enters an e-mail address in the blind carbon copy field 215 by typing the address in the address field or selecting an address from the pull-down menu.

It should be noted that the BCC and the CC fields are independent fields and can handle different types of e-mail addresses in the e-mail client application. Although FIG. 5A illustrates one exemplary embodiment of the present invention, it should be clear that decision steps 525 and 535 are not necessarily considered in a sequential order, and that the CC and the BCC fields could be filled independently.

The user determines whether the content requires an urgent status, instructing the mail server 55 to apply priority status to the email (decision step 545). If yes, the user selects an "urgent" flag or status in the e-mail client application 10A (step 550). The user enters text in the body field 225 (step 555). The user selects an expiration date by, for example, entering an expiration date at the end of the text in the body field 225 (step 560). The user signs the e-mail (step 565) by, for example, providing a name at the end of the body text in the body field 225 or by selecting the "use my signature" check box 255. The user attaches an image, a document, etc. to the e-mail by selecting the attach files button 230 and selecting the desired files for attachment (step 570). The user selects "send" to initiate transfer of the e-mail to the content management system 35 (step 575), thus initiating the import process of the content management system 35 in importing the e-mail to the content repository 40.

Figure 6:
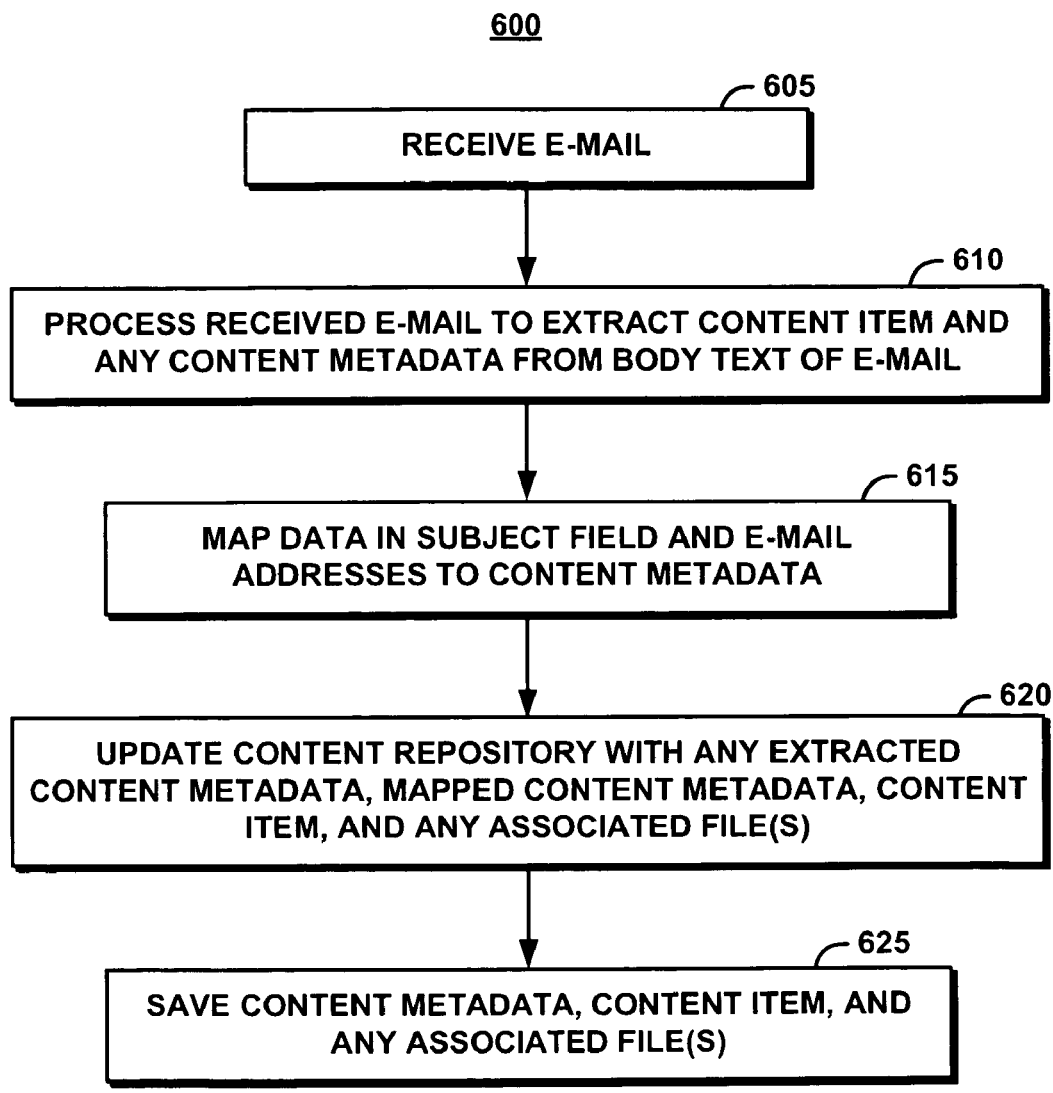
FIG. 6 is a process flow chart illustrating a method of operation of an e-mail processing engine of the e-mail based content import system of FIG. 1.

FIG. 6 illustrates a method 600 of the e-mail processing engine 10B in processing content in the e-mail received from the mail server 25. The e-mail processing engine 10B receives an e-mail (step 605). The e-mail processing engine 10B processes the received e-mail to extract the content item and any metadata from the body text of the e-mail (step 610). The e-mail processing engine 10B maps data entered by the user in the subject field 220 and e-mail addresses entered by the user in the address field 205, the carbon copy field 210, and the blind carbon copy field 215 to content metadata (step 615).

The e-mail processing engine 10B updates the content repository 40 with extracted content metadata, mapped content metadata, the content item, and any associated files transmitted with the e-mail as an attachment (step 620). The content management system 35 saves the updated content metadata, content item, and any associated files transmitted with the e-mail as an attachment (step 625).

It is to be understood that the specific embodiments of the invention that have been described are merely illustrative of certain applications of the principle of the present invention. Numerous modifications may be made to the system and method for importing content into a content management system using an e-mail application described herein without departing from the spirit and scope of the present invention. Moreover, while the present invention is described for illustration purpose only in relation to the Internet, it should be clear that the invention is applicable as well to, for example, to any local or remote network.

What is claimed is:

1. A processor-implemented method of importing content into a content management system, the processor-implemented method comprising:
 receiving, by the content management system, an e-mail containing the content, the content comprising:
  a body containing a content item;
  a subject field containing a predefined value describing an aspect of the content item; and
  a plurality of address fields each containing a respective e-mail address that conforms to a format specified by the content management system, wherein the specified format defines a mapping between a plurality of codes and a plurality of types of content metadata and further defines a code delimiter, each of the plurality of codes identifying a respective, distinct type of the plurality of types of content metadata, wherein each e-mail address contains at least one code, wherein at least one e-mail address further contains a user-specified value for the type of content metadata identified by the at least one code contained in the at least one e-mail address, wherein at least one of the plurality of types of content metadata corresponds to a database field definition;
 initiating a process of importing the content from the received e-mail into the content management system, the process comprising:
  extracting the content item from the body of the received e-mail;

generating content metadata pertaining to the content item, by extracting the at least one code and the user-specified value from the plurality of address fields, according to the specified format, the generated content metadata having one or more of the plurality of types of content metadata, wherein the one or more types of content metadata are determined based on the defined mapping;

storing the extracted content item and the generated content metadata in the content management system; and generating one or more publishable documents based on the extracted content item and the generated content metadata;

wherein each of the plurality of address fields is one of a sender field, a recipient field, a courtesy copy field, and a blind courtesy copy field, wherein each of the respective e-mail addresses in the received e-mail is included not to specify an additional, intended recipient of the e-mail but to establish additional content metadata pertaining to the extracted content item;

wherein each of the plurality of types of content metadata is selected from a content title, a content author, a content heading, a content publish date, a content expiration date, a content topic, and a content advertising parameter, wherein at least three different types of the plurality of types of content metadata are generated.

2. The processor-implemented method of claim 1, wherein the mapping between each of the respective e-mail addresses to the respective content metadata is customizable.

3. The processor-implemented method of claim 1, wherein at least one file is selected as being associated with the content item by specifying the at least one file as an attachment to the e-mail.

4. The processor-implemented method of claim 1, wherein the received e-mail further comprises a date field.

5. The processor-implemented method of claim 1, wherein the content management system includes an e-mail processing engine, wherein the content metadata is generated by the e-mail processing engine in the content management system, wherein the defined mapping is user-customizable, and wherein the e-mail is composed by a user via an e-mail client application.

6. The processor-implemented method of claim 5, whereby the e-mail client application is established as a user interface for importing the content into the content management system, without requiring any other content entry client application to be provided.

7. A processor-implemented system of importing content into a content management system, the processor-implemented system comprising:

an e-mail client application for receiving an e-mail containing the content, the content comprising:
a body containing a content item;
a subject field containing a predefined value describing an aspect of the content item; and
a plurality of address fields each containing a respective e-mail address that conforms to a format specified by the content management system, wherein the specified format defines a mapping between a plurality of codes and a plurality of types of content metadata and further defines a code delimiter, each of the plurality of codes identifying a respective, distinct type of the plurality of types of content metadata, wherein each e-mail address contains at least one code, wherein at least one e-mail address further contains a user-specified value for the type of content metadata identified by the at least one code contained in the at least one e-mail address, wherein at least one of the plurality of types of content metadata corresponds to a database field definition;

wherein the e-mail client application is configured to forward the e-mail to the content management system, wherein the content management system is configured to initiate a process of importing the content from the received e-mail into the content management system, the process comprising:

extracting the content item from the body of the received e-mail;

generating content metadata pertaining to the content item, by extracting the at least one code and the user-specified value from the plurality of address fields, according to the specified format, the generated content metadata having one or more of the plurality of types of content metadata, wherein the one or more types of content metadata are determined based on the defined mapping;

storing the extracted content item and the generated content metadata in the content management system; and generating one or more publishable documents based on the extracted content item and the generated content metadata;

wherein each of the plurality of address fields is one of a sender field, a recipient field, a courtesy copy field, and a blind courtesy copy field, wherein each of the respective e-mail addresses in the received email is included not to specify an additional, intended recipient of the e-mail but to establish additional content metadata pertaining to the extracted content item;

wherein each of the plurality of types of content metadata is selected from a content title, a content author, a content heading, a content publish date, a content expiration date, a content topic, and a content advertising parameter, wherein at least three different types of the plurality of types of content metadata are generated.

8. The processor-implemented system of claim 7, wherein the mapping between each of the respective e-mail addresses to the respective content metadata is customizable.

9. The processor-implemented system of claim 7, wherein the e-mail client application forwards the received e-mail to the content management system by selecting an urgent status indicating a priority for transmission of the received e-mail.

10. A computer program product having program codes stored on a computer-readable storage device which, when executed by a processor, performs an operation for importing content into a content management system, the operation comprising:

receiving, by an e-mail client application, an e-mail containing the content, the content comprising:
a body containing a content item;
a subject field containing a predefined value describing an aspect of the content item; and
a plurality of address fields each containing a respective e-mail address that conforms to a format specified by the content management system, wherein the specified format defines a mapping between a plurality of codes and a plurality of types of content metadata and further defines a code delimiter, each of the plurality of codes identifying a respective, distinct type of the plurality of types of content metadata, wherein each e-mail address contains at least one code, wherein at least one e-mail address further contains a user-specified value for the type of content metadata identified by the at least one code contained in the at least one e-mail address, wherein at least one of the plurality of types of content metadata corresponds to a database field definition;

wherein the e-mail client application is configured to forward the received e-mail to the content management system; and initiating a process, by the content management system, of importing the content from the received e-mail into the content management system, the process comprising:

extracting the content item from the body of the received e-mail;

generating content metadata pertaining to the content item, by extracting the at least one code and the user-specified value from the plurality of address fields, according to the specified format, the generated content metadata having one or more of the plurality of types of content metadata, wherein the one or more types of content metadata are determined based on the defined mapping;

storing the extracted content item and the generated content metadata in the content management system; and generating one or more publishable documents based on the extracted content item and the generated content metadata;

wherein each of the plurality of address fields is one of a sender field, a recipient field, a courtesy copy field, and a blind courtesy copy field, wherein each of the respective e-mail addresses in the received e-mail is included in the e-mail not to specify an additional, intended recipient of the e-mail but to establish additional content metadata pertaining to the extracted content item;

wherein each of the plurality of types of content metadata is selected from a content title, a content author, a content heading, a content publish date, a content expiration date, a content topic, and a content advertising parameter, wherein at least three different types of the plurality of types of content metadata are generated.

11. The computer program product of claim 10, wherein the mapping between each of the respective e-mail addresses to the respective content metadata is customizable.

12. The computer program product of claim 10, wherein the program code for forwarding the received e-mail to the content management system selects an urgent status indicating a priority for transmission of the received e-mail.

* * * * *